UNITED STATES PATENT OFFICE 2,409,915

PROCESS FOR PREPARING RUBBERLIKE MATERIALS

Byron M. Vanderbilt, Cranford, and Ralph F. Howe, Elizabeth, N. J., assignors, by mesne assignments, to Jasco, Incorporated, a corporation of Louisiana No Drawing. Application November 30, 1940, Serial No. 368,106

1 Claim. (Cl. 260—84.5)

This invention relates to the polymerization of olefinic substances into plastic, elastic substances; relates particularly to the polymerization of butadiene containing mixtures in emulsion form at moderately elevated temperatures; and relates especially to methods for speeding up the polymerization reaction and improving the character of the polymer obtained by the emulsion polymerization of diolefin containing mixtures.

It has been found that when butadiene and similar substances are emulsified in water, either singly or in admixture with certain other unsaturated substances, at ordinary or elevated temperatures, and maintained in emulsion form for a prolonged period of time, a polymerization reaction occurs to produce materials having many of the properties of natural rubber, but as usually carried out, the products are of inferior quality if the reaction mixture is heated to a sufficient temperature to get relatively complete reaction within a few hours and if the reaction is carried out at a sufficiently low temperature in order to get a product of high quality, the reaction time becomes a matter of even days or weeks and the process is economically unfeasible.

The present invention provides a combination of steps by which the polymerization reaction is greatly speeded up, and at the increased reaction speed a polymerizate is obtained which has a high tensile strength, and satisfactory plastic and elastic properties.

According to the present invention, the procedure consists in the preparation of an emulsion of butadiene, with or without auxiliary olefinic polymerizable substances such as acrylonitrile and the like, in water, with an emulsifying agent, preferably of the soap type, and a catalyst of the peroxide type present in optimum concentration; in which the hydrogen ion concentration or pH is accurately controlled to a desired value, and the polymerization procedure is conducted according to a predetermined temperature schedule; by which the initial polymerization reaction occurs at a relatively low temperature, and the final polymerization reaction occurs at a substantially higher temperature and high speed.

According to the invention, the polymerizable materials are preferably selected from such substances as butadiene or mixtures of butadiene with such substances as acrylonitrile, styrene, vinyl naphthalene, unsaturated esters, unsaturated ketones, and similar polymerizable substances. These materials form the polymerizable reactive component of the polymerization mixture, and may be used as butadiene alone, or as butadiene in admixture with one or more of the other substances, in which mixture the butadiene may be present in the ratio of from 30% to the 100% of total reactants. The butadiene, or butadiene mixture, is emulsified in water in the proportion of 100 parts of butadiene material or mixture with from 100 parts to 500 parts of water. The mixture preferably contains an emulsifying agent such as sodium oleate or sodium stearate or sodium palmitate or other soap, or other suitable emulsifying agents such as the salts of sulfated long carbon chain amides and alcohols, alkylated naphthalene sulfonates, and other suitable emulsifying materials. The emulsifier may be present in the proportion of from 0.5 part to 20 parts per 100 parts of olefinic material. There is preferably also added a substantial amount of a peroxide catalyst such as hydrogen peroxide, benzoyl peroxide, ammonium persulfate, or other soluble organic or inorganic peroxide material which is desirably present in the proportion of from 0.05 part to 3 parts per 100 parts of olefinic mixture. The pH of the mixture is then adjusted by the addition of small quantities of certain acidic or basic materials until it is set at a value lying between 8 and 8.8. This mixture is conveniently charged into a metallic vessel with means for efficient mixing of the mixture in order to maintain the olefinic material in an emulsion form and to facilitate removal of the heat of reaction. The temperature may be held within the range of 20 to 30° C. for from 1 to 8 hours; within the range of 25 to 40° C. for a further period of from 2 to 10 hours, and and a temperature ranging from 30° to 50° C. for a further period of from 4 to 12 hours. At the end of this interval the reaction vessel may be opened, any unreacted butadiene volatilized out, and the emulsion broken by the addition of suitable precipitants such as an acid or water-soluble salts or both.

Thus an object of the invention is to speed up the polymerization reaction of olefinic materials and obtain preferred characteristics in the polymer or interpolymer by the addition of the olefinic material to water containing an emulsifying agent while stirring; the addition of a suitable catalyst and conduct of the polymerization reaction under conditions of accurately adjusted hydrogen ion concentration and the application of a gradually rising temperature schedule. Other objects and details of the invention will be apparent from the following description.

Example 1

A mixture was prepared consisting of 420 parts of water containing 2.5% of sodium oleate by weight and 56.3 parts of acrylonitrile, with good mixing. This mixture was transferred to a metallic pressure vessel which was properly sealed, and 160 parts by weight of butadiene were forced in by the application of nitrogen under pressure. Thereafter 10 parts by weight of 27% hydrogen peroxide were also forced into the bomb and then the bomb was sealed. The bomb was then heated to a temperature of 60° C. under conditions of vigorous mechanical agitation to maintain the olefin materials in the emulsion condition, and the heating and agitation were continued for a period of 3 hours. At the end of this time, the unreacted butadiene was allowed to volatilize out of the mixture, the residual emulsion was removed from the bomb and the polymerizate precipitated by the application thereto of 2.5 volumes of saturated sodium chloride solution. 110 parts by weight of polymer were obtained, this being 51% of the original reactants added to the mixture, and being a 51% yield of the theoretical maximum yield.

This material was washed, dried and compounded on a rubber mill according to the following formula:

| | Parts |
|---|---|
| Polymer | 100 |
| Wood rosin | 4 |
| Coal tar | 4 |
| Sulfur | 1.5 |
| Stearic acid | 1.5 |
| Ozokerite wax | 1.5 |
| Zinc oxide | 5 |
| Carbon black | 45 |
| Altax (benzo-mercapto-thiazole) | 1.25 |
| Diphenylguanidine | 0.25 |

This material was vulcanized in a mold at a temperature of 145° C. for a time interval of 45 minutes and after being removed from the mold and cooled showed a tensile strength of 3100 lbs./sq. in. with a 450% elongation at break.

Example 2

A similar mixture of materials was prepared as shown in Example 1, and the emulsion was heated at a temperature of 60° C. for 4 hours (one hour longer than Example 1). The resulting polymer amounted to 60% of the original reactants, which upon curing according to the above formula yielded material having a tensile strength of 3500 lbs./sq. in. and a 450% elongation at break.

Example 3

Another run using a similar mixture polymerized at 60° C. for a time interval of 5 hours gave a yield amounting to 81% of the reactants, and the polymer when compounded according to the above formula and cured had a tensile strength of 2400 lbs./sq. in. and an elongation at break of 400%.

Example 4

A similar olefinic mixture was prepared as in Example 1 and the mixture was heated with vigorous stirring to maintain the emulsion, to 40° C. for a time interval of 4½ hours and then the temperature was raised to 50° C. at which it was maintained for 5 hours. The yield of polymer was 58% of the theoretical maximum; and the polymer upon being precipitated and compounded according to the formula shown in Example 1 and then vulcanized, showed a tensile strength of 3100 lbs./sq. in. and an elongation at break of 450%.

Example 5

An emulsion was prepared as in Example 1, and, without heating, it was stirred vigorously to maintain the emulsion for a time interval of 66½ hours during which the temperature was maintained within the range of from 15° C. to 18° C. At the close of this time interval, the reaction vessel was opened and the butadiene was allowed to volatilize out and was recovered. No solid polymer was found in the mixture, and substantially all of the butadiene and acrylonitrile were recovered unchanged.

This example shows the extremely slow reaction rate, or lack of polymerization, at room temperature.

Example 6

An emulsion was prepared as in Example 1 and heated according to a temperature schedule in which the temperature was held at 25° C. for a time interval of 4 hours; 30° C. for a further time interval of 8 hours; and 40° C. for a still further time interval of 9 hours. Otherwise, the composition of the reaction mixture and the experimental conditions were exactly as those for the above examples. The polymer was separated as in Example 1 and was found to be 75% of the theoretical maximum. It was thereafter compounded according to the formula shown in Example 1 and vulcanized in the same manner. After vulcanization it had a tensile strength of 4500 lbs./sq. in. and an elongation at break of 500%.

The above examples shown the marked advantage of a time and temperature schedule in which the temperature starts at a relatively low value and is raised gradually during the polymerization reaction to yield a product of high quality in a relatively short time.

Example 7

This experiment was conducted in a pressure vessel or bomb equipped with a turbine mixer, by which sufficiently rapid agitation could be obtained to bring the olefinic materials into a good emulsion. 2600 parts by weight of water were placed in the reactor, together with 65 parts by weight of a water soluble soap, specifically sodium oleate and 16 parts by weight of 27% hydrogen peroxide. The pressure vessel was then closed and the stirrer started in vigorous rotation. Thereafter a mixture consisting of 325 parts by weight of acrylonitrile and 975 parts by weight of butadiene was forced into the pressure vessel by the application of nitrogen pressure to the olefinic mixture in a suitable container. The pressure vessel was filled nearly full, to minimize the amount of vaporized butadiene, and when the emulsion was well formed, the temperature was raised to 25° C. and held there for a time interval of 2 hours. Thereafter the temperature was raised to 30° C. for a further period of 6 hours and further raised to 40° C. for a further period of 8 hours, making a total polymerization time of 16 hours. At the end of this time interval, the pressure vessel was opened and the unreacted butadiene allowed to distill off. The residual latex was then withdrawn to a larger container and the polymer was precipitated by the addition of approximately 1 volume of salt solution. A yield of 1092 parts by weight of dry polymer was obtained, being approximately 84% yield of the theoretical maximum. This material was compounded according to the formula shown in Example 1 and vulcanized as in Example 1. After vulcanization, it was found to have a tensile strength of 4500 lbs./sq. in. and an elongation at break of 500%.

This example still further shows the advantages to be derived from a gradually increasing temperature of polymerization according to the indicated schedule.

In the above examples, the pH value was adjusted to approximately 8.4 since it has been found that the hydrogen ion value is exceedingly critical for the obtaining of a rapid reaction and a high grade polymer. According to the present invention, it is found that the polymerization of diolefins such as butadiene or the interpolymerization of diolefins such as butadiene with other unsaturates such as acrylonitrile, styrene, vinyl naphthalene and the like to form vulcanizable rubberlike materials occurs at an extremely slow rate, or does not occur at all if the pH value of the polymerization emulsion lies between about 6.5 and 7.5, in the presence of polymerization catalysts. If polymerization is obtained at all in this pH range, the rate of reaction is slow and the polymers obtained are inferior in nature. At elevated temperatures, such emulsions containing butadiene alone, or mixtures of butadiene with acrylonitrile, styrene, vinyl naphthalene and similar substances polymerize either extremely slowly or not at all at pH values between about 7.0 to 7.7. In the pH range of from 7.7 to 8.1 polymerization occurs at fairly rapid rate but the emulsions or latices formed are unstable and tend to precipitate in the reactor. The preferable pH range lies between the values of about 8.1 to about 8.8. Within this range polymerization occurs rapidly to form elastic polymers in good yield of high tensile strength and high elongation. The best results are obtained at pH value of approximately 8.4. As the alkalinity is raised about about 8.8, the reaction becomes progressively slower with increasing hydroxyl concentration. The emulsions formed are stable but the products obtained are of lower quality as compared to those obtained at the preferred hydrogen ion value.

*Example 8*

An emulsion of butadiene and acrylonitrile was prepared as in Example 7 and the pH value was raised to 9.6 by the addition of small quantities of sodium hydroxide solution. The emulsion was then heated in the pressure vessel to a temperature of 25° C. for a time interval of 4 hours, then to 30° C. for a further time interval of 8 hours, then to 40° C. for a still further time interval of 8 hours and then to 50° C. for an additional time interval of 1 hour. The reaction was 78% complete after 21 hours and the polymer after compounding and vulcanizing had a tensile strength of 4300 lbs./sq. in.

*Example 9*

An emulsion was prepared as in Example 7 and the pH value was adjusted to 8.45. Thereafter the mixture was heated according to the time schedule set out in Example 8. At the end of the 21 hours reaction time, the polymer was separated and the reaction found to be 93% complete. The polymer was washed, compounded according to the formula given in Example 1, vulcanized in the manner above shown and was then found to have a tensile strength of 4420 lbs./sq. in. and an elongation of approximately 550% at break.

*Example 10*

A mixture of the following composition was prepared in a pressure vessel of the turbine mixer type:

| | Parts by weight |
|---|---|
| Water | 850 |
| Igepon T (sulfated long carbon chain amide) | 10 |
| Acrylonitrile | 113 |
| Butadiene | 320 |
| Hydrogen peroxide (27%) | 20 |

This mixture was heated at a temperature of 50° C. for a time interval of 22 hours. At the close of that time substantially all of the butadiene and acrylonitrile were recovered unchanged from the mixture and no polymer was found to have been formed showing that no polymerization reaction occurred. It may be noted that the Igepon T is neutral and the above mixture was neutral, having a hydrogen ion value of approximately $10^{-7}$.

*Example 11*

A similar mixture to that of Example 10 was prepared and 2 parts by weight of normal sodium hydroxide solution was added. This mixture was heated at a temperature of 50° C. for 22 hours. At the close of this interval, 80% of the reactants were found to have polymerized to a high-grade, rubber-like polymer.

*Example 12*

A similar mixture to that of Example 10 was prepared except that 2 parts by weight of normal acetic acid solution was added to the mixture. The emulsion was then heated to a temperature of 50° C. for 22 hours. At the end of this time the reaction was 90% complete, but a relatively large amount of the product was found as a dense coherent precipitate in the reaction vessel.

*Example 13*

A mixture was prepared in a pressure vessel equipped with a turbine stirrer as in Example 10, consisting of the following materials:

| | Parts by weight |
|---|---|
| Water | 395 |
| Dodecyl amine | 7.4 |
| 0.94 normal acetic acid | 30 |
| Acrylonitrile | 56.3 |
| Butadiene | 160 |
| Ammonium persulfate | 0.2 |

This mixture had an initial pH value of 7.0. It was heated according to the schedule of Example 8 with efficient stirring to maintain the emulsion. At the end of the 21 hours, the butadiene was distilled out and 155 parts of the original 160 parts were recovered. Only a little dark brown oil was formed as a polymerizate.

*Example 14*

A mixture similar to that of Example 13 was prepared but with 36 parts by weight of the acetic acid solution, thereby adjusting the pH to a value of 6.2. A 62% yield of good polymer was obtained after heating identically as was Example 13, which after washing, compounding, and vulcanizing as in Example 1, was found to have a tensile strength of 3900 pounds per sq. in.

Example 15

A mixture of 400 parts by weight of water containing 8 parts of sodium lauryl sulfate was well agitated while adding 50 parts of styrene. Four parts of trisodium phosphate was then added and the emulsion was found to have a pH of 11.1. The mixture was placed in a pressure vessel and then 150 parts of butadiene containing 1 part of benzoyl peroxide was added under pressure while mixing. The reaction mixture was then heated to 50° C. for a period of 17 hours. It was found that 35% of the total weight of the styrene and butadiene had been converted to a rubber-like solid.

This preparation was repeated and modified in that sodium bicarbonate was used as buffer to give an initial pH of 8.5. After the 17 hour reaction period at 50° C. a concentrated latex was formed which, on coagulation with isopropyl alcohol, gave 152 parts of polymer of high tensile strength, a 76% yield.

It has been found that not only are the hydrogen ion and temperature schedules of very great importance, but it has also been found that the catalyst concentration likewise, is of great importance in order to get polymers of high quality in relatively short reaction periods. It is also found that the peroxide catalyst such as hydrogen peroxide, benzoyl peroxide, ammonium persulfate or the like should be present in an amount of 0.05 to 0.3% of the aqueous phase. At higher values than 0.3% the resulting polymer is of lower tensile strength and has inferior plastic properties and the rate of reaction is markedly decreased. On the other hand, if the initial concentration of the catalyst is less than about 0.05% in the aqueous phase, the reaction proceeds less rapidly, and when the catalyst concentration is as low as 0.01% of the water phase, the reaction rate is approximately that obtained when no catalyst is present.

The following table shows the effect of change in concentration of hydrogen peroxide catalyst in the water phase when copolymerizing a mixture of 25% of acrylonitrile and 75% butadiene in emulsion at a pH of 8.4:

| $H_2O_2$ in the water phase | Percent converted after— | | | Samples removed after 21 hours | |
|---|---|---|---|---|---|
| | 20 hrs. | 21 hrs. | 22 hrs. | Tensile strength | Percent elongation |
| Percent | | | | Pounds | |
| 0.6 | | 77 | 81 | 4,500 | 500 |
| 0.3 | | 85 | 90 | 4,550 | 625 |
| 0.15 | | 91 | 94 | 4,100 | 500 |
| 0.075 | 89 | 94 | | 4,400 | 500 |
| 0.038 | | 40 | | Too sticky to compound and cure | |

It will be observed from this table that the optimum concentration of catalyst lies in the range of about 0.05% to 0.1%.

It may be noted that the catalyst proportion in this mixture shows an optimum value at which a maximum rate of polymerization occurs. This phenomenon is entirely contrary to most polymerization reactions. In the present instance, as the catalyst concentration is increased from 2 or 3 hundredths of 1% up to approximately 0.075%, the reaction rate increases with increase in concentration; when, however, the catalyst concentration is increased above about 0.1%, the reaction rate decreases. This is in contrast to most catalytic processes, in which an increase in the catalyst content increases the reaction rate; and this is particularly so with substantially all other olefinic polymerization reactions.

Example 16

A mixture was prepared in the pressure reactor as in Example 13 according to the following formula:

| | Parts by weight |
|---|---|
| Water | 380 |
| Dodecyl amine | 7.4 |
| 0.943 normal acetic acid | 40.8 |
| Acrylonitrile | 56.3 |
| Ammonium persulfate | 0.8 |
| Butadiene | 160 |

This mixture was heated for a time interval of 21 hours according to the temperature schedule shown in Example 8. At the end of this reaction time, the unreacted butadiene was distilled off, the polymer precipitated as before, and the yield was found to be 61% of the theoretical maximum. However, a considerable portion of the polymer was found to have precipitated in the reactor and the product was discolored and generally unsatisfactory. After washing, compounding and curing as in Example 1, it was found to have relatively low tensile strength and low elongation.

Example 17

A similar mixture to that in Example 16 was prepared with only 0.2 part by weight of ammonium persulfate. This mixture was stirred and allowed to react through the same time schedule as in Examples 8 and 16. At the end of the reaction period the unreacted butadiene was distilled off, the polymer precipitated and found to consist of approximately 80% of the original reactants. This emulsion was recovered from the reaction chamber as a latex of good color which after precipitation, washing, compounding, and vulcanizing as in Example 1, was found to have a good tensile strength and satisfactory elongation and plastic properties.

The above examples utilize mainly mixtures of butadiene and acrylonitrile, but the same factors and values apply to mixtures containing only butadiene as the reactant and to mixtures containing both butadiene and styrene, vinyl methyl ketone and similar unsaturates. Likewise, while only hydrogen peroxide, and ammonium persulfate and benzoyl peroxide, are shown as catalysts, the same requirements and similar molar values apply for the other peroxide catalysts, such as sodium perborate. Modifying agents such as organic sulfur compounds may also be added in order to modify the polymerization process in order to obtain more plastic products. Similarly, while a few representative temperature schedules are given, it will be appreciated by those skilled in the art that different unsaturates require different temperatures for polymerization and the invention comprises the use of any temperature schedule in which a progressively increasing temperature is used at progressively later times in the course of the polymerization reaction.

It should be understood that the materials employed in the various examples cited above were of commercial grade. By using diolefins and other copolymerizing materials of very high purity, the reaction period may be greatly decreased. For example, when highly purified butadiene and acrylonitrile were used in the processes as described above, the copolymerization reaction was 75% complete after only 7 hours and the rubberlike material obtained was of excellent quality.

It should be appreciated that different diolefins, singly and with other olefinic materials capable of copolymerizing in emulsion form, vary in their activity at a given temperature. Vinyl naphthalene is less reactive with butadiene than is styrene and a higher initial temperature is required. Also acrylonitrile is more reactive with butadiene than is styrene and mixtures of acrylonitrile and butadiene containing 40% acrylonitrile are more reactive than those containing 15% of the nitrile. Thus the optimum temperature range employed will vary with the reactants employed, but temperatures above about 60° C. and below about 25° C. are undesirable, regardless what olefinic reactants are employed.

Although we prefer to use our stepwise temperature control, we also may use a constant reaction temperature. When using a constant reaction temperature of about 40° C. at a pH of 8.4, a faster reaction and a superior polymerizate is obtained as compared to those obtained at a like temperature outside of the 8.1-8.8 pH range.

Thus, the invention consists of an emulsion polymerization reaction of olefinic materials to produce rubber-like polymers in which the emulsion is maintained by a suitable emulsifying agent, the polymerization reaction is promoted by a catalyst in concentration of 0.02 to 0.3% in the water phase, the pH value is maintained between about 8.1 and 8.8, a gradually rising temperature schedule for the polymerization time is used to produce a very high grade polymer having high tensile strength, high elongation, and other desirable physical characteristics and the polymerization process is accomplished in a relatively short time.

While there are above disclosed but a limited number of embodiments of the invention, it is possible to produce still other embodiments without departing from the inventive concept herein disclosed, and it is therefore desired that only such limitations be imposed upon the appended claim as are stated therein or required by the prior art.

The invention claimed is:

In an emulsion polymerization process for the polymerization of a mixture of butadiene and acrylonitrile in the ratio of about three parts by weight of butadiene for each part by weight of acrylonitrile, the steps in combination of mixing the mixture of butadiene and acrylonitrile with water in the presence of an emulsifying agent comprising a water soluble soap and a peroxide polymerization catalyst, agitating the material to maintain the mixture in emulsion in the water, setting the temperature of the mixture at approximately 25° C., holding the temperature at approximately 25° C. for a time interval of approximately four hours, then raising the temperature to approximately 30° C. for a further time interval of approximately eight hours, then raising the temperature to approximately 40° C. for a further time interval, maintaining the pH value of the material within the range between 8.1 and 8.8 during the entire polymerization reaction, cooling the material at the end of the polymerization, and separating the polymer from unpolymerized olefinic material.

BYRON M. VANDERBILT.
RALPH F. HOWE.